Jan. 1, 1952  G. E. BERGGREN  2,581,230
CONTINUOUS VULCANIZING METHOD AND APPARATUS
Filed June 19, 1948  2 SHEETS—SHEET 1
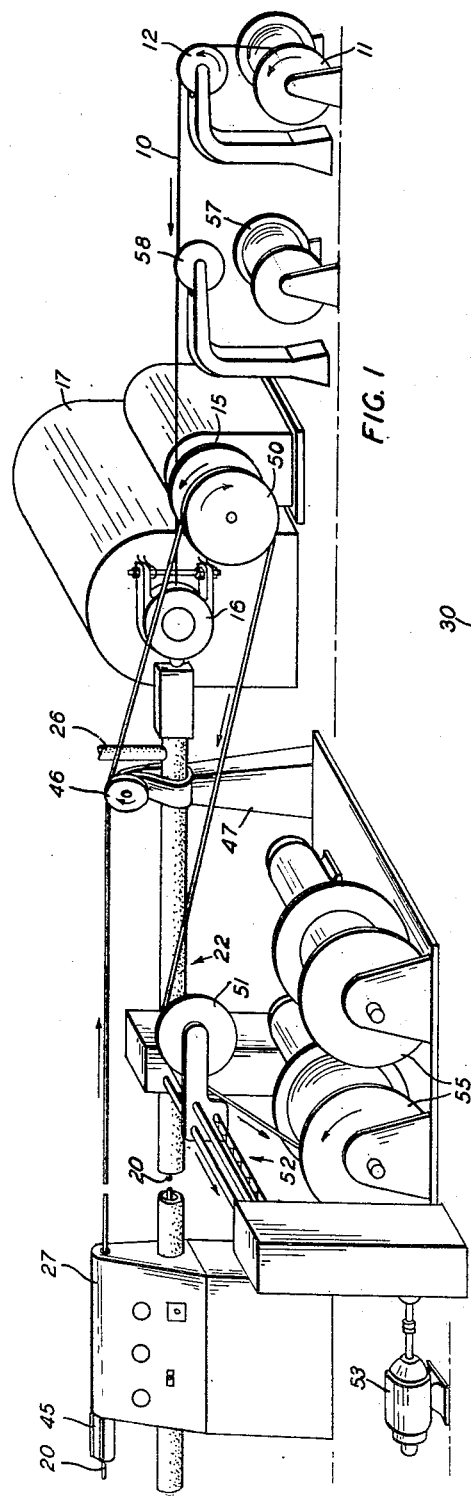
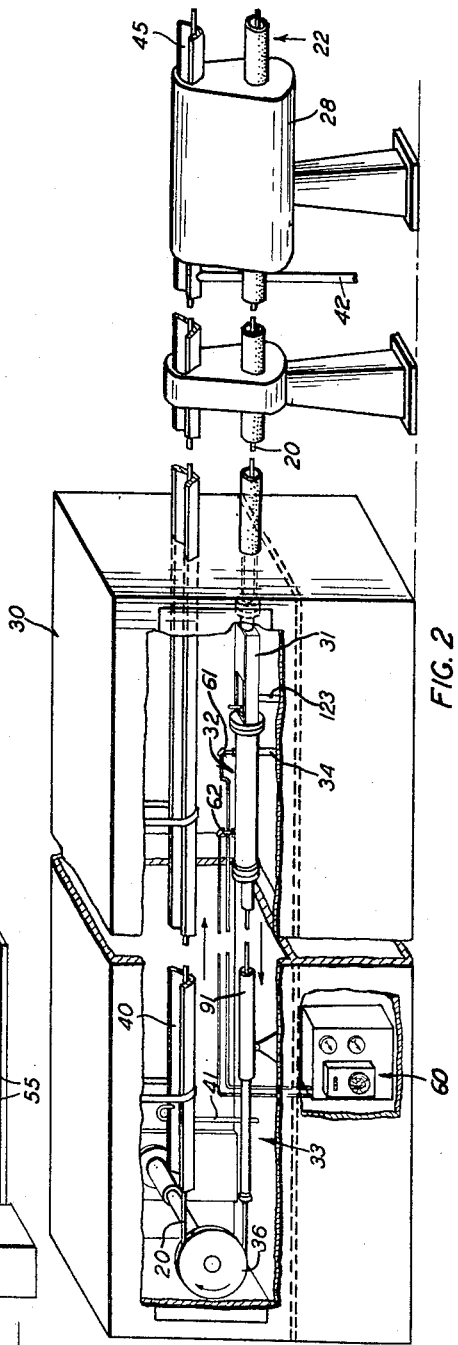
INVENTOR
G. E. BERGGREN
BY
ATTORNEY

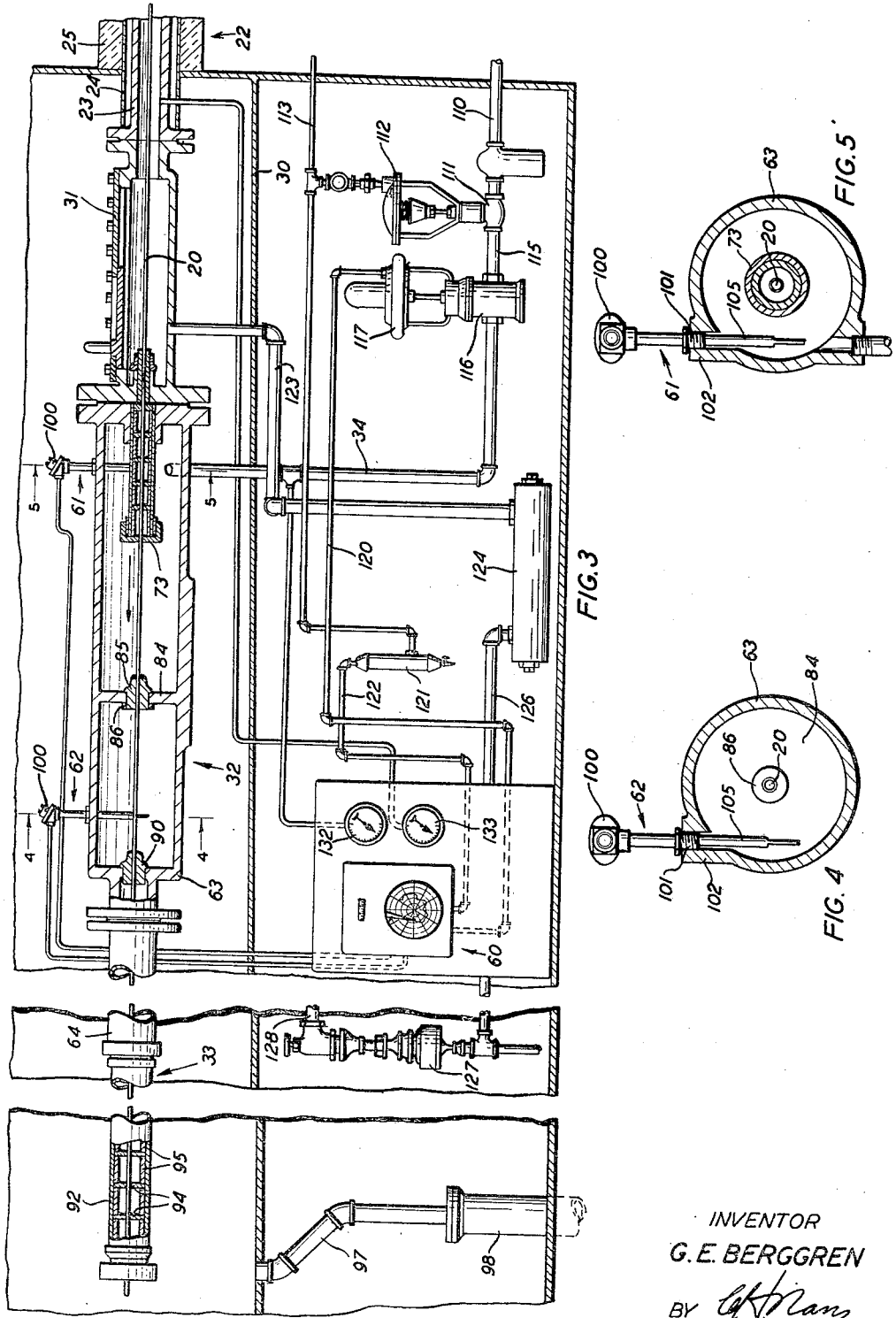

Patented Jan. 1, 1952

2,581,230

UNITED STATES PATENT OFFICE 2,581,230

CONTINUOUS VULCANIZING METHOD AND APPARATUS

George E. Berggren, Baltimore, Md., assignor to Western Electric Company, Incorporated, New York, N. Y., a corporation of New York Application June 19, 1948, Serial No. 34,056

20 Claims. (Cl. 18—6)

This invention relates to continuous vulcanizing methods and apparatus, and more particularly to methods of and apparatus for vulcanizing coverings of vulcanizable material upon continuously advancing conductors.

In the manufacture of insulated filamentary articles such as insulated and jacketed conductors and cables, a core having an outer covering of vulcanizable compound therearound is advanced through an elongated vulcanizing tube containing a high temperature vulcanizing medium under high pressure, such as high pressure steam, to vulcanize the covering on the core. Frequently, the core may include a layer of textile material such as a cotton serving or a braided or knitted cotton covering. In that case, the vulcanization of the outer covering often develops high internal pressure in entrapped pockets of air and moisture within the textile layers which must be reduced materially before the core emerges into the atmosphere in order to prevent blistering of the resulting vulcanized covering.

This is generally accomplished by passing a core and its vulcanized covering directly into an elongated cooling tube supplied with a low temperature cooling medium, such as cold water, under pressure for the purpose of cooling the covering until the internal pressures within the covering have been reduced to values such that there is no danger of the cover blistering when it emerges into the atmosphere. Various devices have been proposed for use at the junction point of the vulcanzing tube and the cooling tube to maintain the escape of the vulcanizing medium from the vulcanizing tube at a minimum because excessive leakage of the high temperature vulcanizing medium into the cooling tube raises the temperature of the cooling medium and thereby impairs the efficiency of the cooling medium. Also, it is desirable to minimize the loss of heat from the vulcanizing medium. To hold the leakage of the vulcanizing medium to a minimum, the pressure of the cooling medium must be maintained substantially equal to the pressure of the vulcanizing medium at all times.

An object of the invention is to provide new and improved methods of and apparatus for vulcanizing coverings surrounding continuously advancing cores.

A further object of the invention is to provide new and improved vulcanizing methods and apparatus employing a vulcanizing tube and a cooling tube, and new and effective methods and means for maintaining the pressure of the water in the cooling tube substantially equal to the pressure of the vulcanizing medium in the vulcanizing tube at all times.

Apparatus embodying certain features of the invention, by means of which methods embodying certain features of the invention may be practiced, comprises an elongated tube through which a continuously advancing core having a vulcanizable covering thereon may be passed, means for supplying a high temperature, high pressure fluid to a portion of the tube first encountered by the core to vulcanize the covering on the core, means for supplying a low temperature cooling fluid to a portion of the tube subsequently encountered by the advancing core to cool the vulcanized covering as it emerges from the vulcanizing fluid, and means responsive to a temperature differential existing at remote points in the cooling fluid for maintaining the pressure of the cooling fluid and the vulcanizing fluid substantially in equilibrium at all times.

A complete understanding of the invention may be obtained from the following detailed description of an apparatus forming a specific embodiment thereof, when read in conjunction with the appended drawings, in which:

Fig. 1 is a perspective view of a portion of an apparatus, which may be used for vulcanizing insulating coverings on continuously advancing filamentary cores in accordance with one embodiment of the invention;

Fig. 2 is a perspective view showing a continuation of the apparatus shown in Fig. 1 extending from the left-hand end thereof;

Fig. 3 is an enlarged fragmentary side elevation of the portion of the apparatus shown in Fig. 2;

Fig. 4 is an enlarged vertical sectional view taken along line 4—4 of Fig. 3, and Fig. 5 is an enlarged vertical section taken along line 5—5 of Fig. 3.

Referring now in detail to the drawings and more particularly to Fig. 1, a filamentary conductor 10 is being withdrawn from a rotatably mounted supply reel 11 and around a guide pulley 12 by a motor driven capstan 15, which is turning at a constant rate of speed in a counterclockwise direction. The conductor 10 passes around the capstan 15 and then through an extruding head 16, forming part of an extruder 17, which extrudes a vulcanizable covering around the conductor 10 to form a covered conductor indicated by the numeral 20.

Upon leaving the extruding head 16, the covered conductor 20 passes into an elongated vulcanizing tube indicated generally at 22 which consists of a steam tube 23, a tubular jacket 24 surrounding the tube 23, and an insulating jacket 25 surrounding the jacket 24. High pressure, high temperature steam is admitted to the steam tube 23 by means of a pipe 26 whereby the entire tube 23 is filled with high pressure steam. Steam at a lower pressure is admitted to the jacket 24 surrounding the tube 23 to heat the steam tube 23.

The vulcanizing tube 22 (Fig. 1) is joined to the extruding head 16 in a suitable manner and continues therefrom through a housing enclosing a high voltage sparktester 27 (Fig. 1), and through a housing enclosing an air wiper 28 to an elongated enclosure 30. The covered conductor 20 passes through the elongated vulcanizing tube 22, and upon emerging therefrom passes directly through a splice box 31, an elongated cooling tube indicated generally at 32 and a pressure reducing nozzle 33 into the atmosphere. Low temperature water under high pressure is admitted to the cooling tube 32 by a pipe 34 for the purpose of cooling the previously vulcanized covering of the covered conductor 20. Upon leaving the nozzle 33, the conductor 20 passes around an idler pulley 36 and then travels along a V-shaped trough 40 to which a continuous stream of cold water is supplied by a pipe 41. A pipe 42 is connected to the trough 40 adjacent to the air wiper 28 to drain the water from the trough.

The conductor 20 passes from the trough 40, through the air wiper 28, which removes the moisture from the vulcanized covering, and then travels along a second V-shaped trough 45 to the sparktester 27 where the covering on the conductor is subjected to a high voltage testing operation. The conductor then passes around an idler pulley 46, which guides the conductor 20 to a capstan 50 turning at a constant rate of speed in a clockwise direction. The conductor 20 passes around the capstan 50 several times and then around a pulley 51 mounted on a distributing apparatus, indicated generally at 52, which is driven by a motor 53. The distributing apparatus 52, including the pulley 51, distributes the conductor 20 evenly on one or the other of motor driven takeup reels 55—55.

The takeup reels 55—55 are provided for the purpose of permitting continuous reeling of the covered conductor 20. A second supply reel 57 containing a conductor identical with the conductor 10, and a second guide pulley 58 are provided for the purpose of maintaining a supply of filamentary conductor which will permit a substantially continuous extruding and vulcanizing process.

The covering on the conductor 20, in passing through the steam tube 24 of the vulcanizing tube 22, is subjected to sufficient heat and pressure to vulcanize the covering. However, if a textile covering is present beneath the vulcanized covering, undesirable high internal pressures may be developed in entrapped pockets of air and moisture within the textile covering during the vulcanization of the outer covering. In order to prevent these high internal pressures from blistering the vulcanized covering when the conductor emerges into the atmosphere, the conductor 20 passes directly from the steam tube through the cooling tube 32 filled with low temperature water under pressure, which serves to cool the covering while keeping the covering under pressure and reduces the internal pressures within the coverings to values such that there is no danger of the covering blistering when the covering emerges into the atmosphere.

While the pressure of the cooling water in the cooling tube 32 must be maintained at a pressure equal at least to the pressure of the entrapped air and moisture to prevent the covering from blistering as it passes through the cooling tube, it is also expedient that it be maintained substantially equal to the pressure of the steam in the vulcanizing tube in order to prevent excessive escape of steam therefrom into the cooling tube. Such leakage of steam results in raising the temperature of the cooling water above its most effective operating temperature and in loss of high temperature steam from the vulcanizing tube. The steam admitted to the steam tube 23 is subject to substantial fluctuation in pressure over sustained periods of operation and it is necessary, therefore, to maintain the pressure of the water in the cooling tube substantially equal to the pressure of the steam in the steam tube at all times.

An electronic controller indicated generally at 60 (Fig. 2) is electrically connected to resistance bulbs 61 and 62 positioned in the cooling tube 32. The controller 60 and the bulbs 61 and 62 are provided for the purpose of maintaining the water in the cooling tube at a pressure determined by the differential existing in the temperatures of the cooling water at the temperature bulbs due to a particular operating temperature and pressure of the steam. When the pressures of the water and steam are substantially equal, a definite temperature differential exists in the cooling water between the bulbs 61 and 62 due to a normal leakage of steam from the vulcanizing tube 22 into the cooling tube 32 and the transfer of heat from the vulcanized covering of the conductor 20 to the water as the conductor passes therethrough. The temperature differential in the cooling water may be held substantially constant for such balanced pressure conditions by circulating the low temperature water through the cooling tube 32 at a rate commensurate with the pressure and temperature of the steam. The combination of the heating effect of the conductor on the cooling water plus the leakage of the steam into the cooling tube, plus the fact that the pressure of the steam is subject to fluctuation, requires a flexible pressure control system capable of maintaining the water pressure and the steam pressure substantially in equilibrium throughout long periods of operation.

The temperature controller 60 includes a sensitive Wheatstone bridge circuit in which the resistance bulbs 61 and 62 are connected and an electronic circuit for amplifying any unbalance potential occurring across the bridge circuit. The amplified potential is utilized to rebalance the bridge circuit and in so doing to actuate an air bleeder valve of the controller to vary the output air pressure of the controller which is used for controlling an air-operated valve regulating the pressure of the water admitted to the cooling tube 32. Each temperature differential existing between the resistance bulbs 61 and 62 calls for a different balance of the bridge circuit and a corresponding operating position of the air bleeding valve.

One type of such a controller is manufactured by the Foxboro Company, Foxboro, Mass. and is described in detail in their book No. 644 entitled "Temperature Controller" on pages 1 and 2, identified as 16—300 and dated February 1945, pages 1 and 2, identified as 11—449 and dated February 1947, pages 1 and 2, identified as 16—300 and dated May 1947, pages 1 and 2, identified as 13—150 and dated February 1947, pages 1 and 2, identified as 11—452 and dated October 1946, pages 1 and 2, identified as 11—460 and dated October 1946, pages 1 and 2, identified as 11—461 and dated April 1946, pages 1, 2 and 3, identified as 11—462, and dated July 1947. A schematic diagram of such a controller is shown in my copending application Serial No. 37,583, filed July 8, 1948. In view of the description contained in the above-mentioned book, a detailed description of the construction and operation of the controller 60 is unnecessary.

Referring now to Fig. 3 of the drawings, it will be noted that the cooling tube 32 comprises a tubular body 63 and an elongated tubular member 64 connected so as to communicate with the tubular body. The cooling tube 32 has its right end connected to the adjacent end of the splice box 31 so as to communicate therewith, and the left end thereof is connected so as to communicate with the nozzle 33. The tubular body 63 has a baffled tube 73 positioned in the entrance end thereof through which the conductor 20 passes in traveling from the splice box 31 into the tubular body 63 of the cooling tube 32. The tube 73 prevents sudden increases in the pressure of the steam in the vulcanizing tube from causing the steam to surge into the cooling tube 32 and force a substantial amount of water therefrom through the nozzle 33, and also prevents the water in the cooling tube from surging into the splice box upon substantial decreases in the pressure of the steam. The baffled tube 73 is fully described and claimed in my co-pending application Serial No. 17,916, filed March 30, 1948, hence a more detailed description of the seal is not necessary herein.

The tubular body 63 (Fig. 3) is provided with a partition 84 positioned intermediate the ends of the body which partition is provided with a gland 85 centrally secured to the partition by means of a nut 86. A gland 90 is mounted in a central bore provided in the exit end of the tubular body 63 to substantially seal the exit end of the cooling tube. Each of the glands 85 and 90 is provided with a central aperture through which the conductor 20 passes as it travels through the cooling tube 32, and sufficient clearance is provided between the central aperture and the covered conductor to permit passage of the conductor therethrough without scarring the covering on the conductor.

The nozzle 33 secured on the exit end of the tubular member 64 of the cooling tube 32 consists of an elongated tubular member 92 removably secured to the adjacent end of the tubular member 64 of the cooling tube. The tubular member 92 has a plurality of annular baffles 94—94 positioned therein between tubular spacers 95—95. The baffles 94—94 are provided with the central apertures through which the conductor 20 passes as it travels through the nozzle 33 and emerges into the atmosphere.

The provision of the baffles 94—94 (Fig. 3) in the nozzle 33, permits the water in the cooling tube 32 to escape therefrom at a substantially low rate of flow into the closure 30 and at the same time gradually reduces the pressure of the escaping water substantially to that of the atmosphere. The nozzle permits a continuous circulation of the cooling water admitted through the pipe 34 through the entire length of the cooling tube 32, whereby the cooling water may be maintained at its most effective operating temperature. The cooling water discharged from the end of the nozzle 33 into the closure 30, is drained from the closure 30 by a pipe 97 to a large drain 98. The drain 98 may return the water to a suitable water cooling system, and then the cooled water may be recirculated through the water cooling system including the cooling tube 32.

The resistance bulb 61 (Fig. 5) is positioned adjacent to the right end of the tubular body 63 of the cooling tube 32 so that the portion to be immersed in the cooling water is directly in the path of the incoming water supplied to the cooling tube by the pipe 34. The resistance bulb 62 (Fig. 4) is positioned adjacent to the left end of the tubular body 63 of the cooling tube 32 and measures the temperature of the water after it has circulated through the tubular body. The resistance bulbs 61 and 62 are identical in construction and have the same electrical characteristics, hence only the resistance bulb 61 will be described in detail.

A terminal head 100 (Fig. 5) is provided on the outer end of the resistance bulb 61 by means of which the bulb is connected electrically to the controller 60. The terminal head 100 is secured to a body portion 101 which threadedly engages a boss 102 provided in the tubular body. A thin shell 105 is secured to the threaded body 101 and has the free end thereof sealed so as to completely enclose a sensitive resistance element (not shown) positioned therein.

Low temperature water, under a pressure substantially higher than the maximum pressure which may be reached by the steam in the vulcanizing tube 22 is conducted from a suitable supply source by a pipe 110 (Fig. 3) to a reducing valve 111 arranged to be actuated by an air diaphragm 112. The air diaphragm 112 receives air under constant pressure from an air supply pipe 113 which actuates the diaphragm 112 and sets the opening of the valve 111 so that it produces a constant water pressure in the pipe 115, which pressure is still above the maximum pressure of the steam in the vulcanizing tube. The pipe 115 conducts the water leaving the valve 111 to a reducing valve 116 arranged to be actuated by an air diaphragm 117 which receives air under a pressure controlled by the controller 60 through a pipe 120. The valve 116 is connected to the cooling tube 32 by the pipe 34, whereby the water emerging from the pipe 115, after being subjected to a further reduction in pressure by the valve 116 in accordance with the air pressure applied on its diaphragm 117 by the controller 60, then is conducted to the cooling tube 32. Air is supplied to the temperature controller 60 from the supply pipe 113 through a filter dripwell 121 and a pipe 122.

The steam in the splice box 31 (Fig. 3) and the water from the body 63 of the cooling tube contact each other at the entrance end of the baffled tube 73, whereby the area in the splice box adjacent to the entrance end of the tube 73 contains a condensate consisting of low temperature steam and hot water. A pipe 123 is connected to the bottom of the splice box 31 to conduct this condensate from the splice box to a drain pot 124, and from the drain pot through a pipe 126 to a drain valve 127 arranged to discharge the condensate from the splice box into a drain pipe 128 at a predetermined rate.

A water pressure gauge 132 is mounted adjacent to the controller 60 for indicating the pressure of the water in the supply pipe 34 and the cooling tube 32. A pressure gauge 133 is also positioned adjacent to the controller 60 for indicating the pressure of steam in the steam tube 23 of the vulcanizing tube 22.

*Operation*

Let it be assumed that the conductor 10 has been threaded through the apparatus from the supply reel 11 to one of the takeup reels 55—55, that the vulcanizing tube 22 is filled with high pressure, high temperature steam, that the cooling tube 32 is filled with low temperature water, and that the controller 60, in response to the temperature differential between the bulbs 61 and 62, has adjusted the opening of the valve 116 so that the pressure of the water in the cooling tube is substantially equal to the pressure of the steam in the vulcanizing tube and the splice box. The capstans 15 and 50 then are placed in operation to draw the conductor 20 through the apparatus, in which case, the covered conductor 20 emerges from the extruding head 16 of the extruder 17 and passes through the vulcanizing tube 22, where the covering is subjected to heat and pressure sufficient to vulcanize the covering. During the vulcanization of the covering there may develop undesirable high internal pressures in entrapped pockets of air and moisture within the covering. The conductor and the vulcanized covering then pass through the cooling tube 32, whereby the vulcanized covering is cooled so as to reduce the internal pressures in the entrapped pockets of air and moisture to values such that there is no danger of the covering blistering when the conductor 20 emerges from the nozzle 33 into the atmosphere.

As the apparatus operates with the pressure of the steam and the water substantially equal, there is a minimum leakage of steam through the baffled tube 73 into the cooling tube 32 as the conductor passes through the tube. This leakage of steam into the cooling tube together with the heat transfer between the vulcanized covering and the water creates a temperature differential in the cooling water surrounding the resistance bulbs 61 and 62 positioned in the tubular body 63 of the cooling tube 32. This temperature differential between the bulbs 61 and 62 causes the controller 60 to maintain an air pressure on the diaphragm 117 of the valve 116 which sets an opening of the valve sufficient to maintain the pressure of the water in the cooling tube substantially equal to the pressure of the steam in the vulcanizing tube. At the same time, this opening of the valve 116 maintains a circulation of water through the cooling tube and nozzle at a rate commensurate with the temperature and pressure of the steam in the vulcanizing tube. The rate at which the water circulates through the cooling tube 32 under the pressure set by the controller 60 maintains the heating effect that the steam and the heat transfer from the vulcanized covering have on the water within safe limits so that the water in the cooling tube is maintained at its most effective operating temperature at all times.

As long as such balanced operating conditions prevail between the steam and water pressures, the controller 60 maintains this control of the valve 116, in which case the temperature differential between the bulbs 61 and 62 will remain substantially constant. Since the steam in the vulcanizing tube 22 is subject to substantial variations in pressure over long periods, the controller 60, in response to a temperature differential produced by a given steam pressure, continuously maintains the pressure of the water in the cooling tube substantially equal to the pressure of the steam in the vulcanizing tube.

Let it be assumed that a sudden increase in the pressure of the steam in the vulcanizing tube 22 occurs. This increase in the pressure of the steam increases the leakage of steam through the baffled tube 73 into the tubular body 63 as the conductor 20 passes through the tube 73. This increased leakage of the steam through the tube 73 raises the temperature of the water in the cooling tube, and if this condition were allowed to prevail for a prolonged period of time, the temperature of the water would reach a point at which the vulcanized covering 20 would not be cooled sufficiently in passing through the cooling tube. As a result, the high internal pressures developed within the covering during the vulcanization thereof would not be reduced to safe values, and when the covered conductor emerges into the atmosphere, blistering of the covering would occur. The water heated by the increased leakage of steam into the tubular body circulates through the right-half of the tubular body and strikes the partition 84 which causes a mixing of the heated water with the low temperature water lining the wall of the tubular body. This heated water then passes through the central aperture of the gland 85 with the conductor 20 and mixes with the water in the left-half of the tubular body and finally increases the temperature of the water surrounding the shell 105 of the bulb 62. It should be noted that the resistance bulb 61 is positioned directly in the path of the incoming water from the pipe 34 and is, therefore, substantially unaffected by the increased leakage of the steam from the vulcanizing tube and the increase in the temperature of the water in the tubular body 63.

The increase in temperature of the water surrounding the bulb 62 increases the temperature differential of the cooling water contacting the bulbs 61 and 62, which immediately necessitates an adjustment of the bridge circuit of the electronic controller 60, which in turn increases the air pressure applied on the diaphragm 117 of the valve 116. This increased air pressure on the diaphragm 117 increases the opening of the valve 116, and thereby permits an increased pressure and rate of flow of water in the cooling tube 32. The initial increase in the opening of the valve 116 is sufficient to raise the pressure of the water in the cooling tube slightly above the increased steam pressure in the vulcanizing tube, in which case there occurs a decreased leakage of steam into the tubular body and a gradual decrease in the temperature differential of the cooling water surrounding the bulbs. The controller 60, in response to the decreasing temperature differential in the cooling water, effects a corresponding decrease in the opening of the valve 116. However, the controller 60 cannot restore the initial temperature differential that existed in the cooling water in the tubular body prior to the increase in the steam pressure due to the increased heating effect of the steam and the vulcanized covering on the water in the cooling tube, resulting from the increased temperature of the steam which occurs wih the increase in the steam pressure.

This combined increased heating effect on the water in the tubular body creates a slightly increased operating temperature of the water in the tubular body, and consequently a slight increase in the temperature differential between the bulbs 61 and 62 over that which existed before the increase in the steam pressure occurred. As a result, the controller 60, in response to the new temperature differential between the bulbs 61 and 62, effects an opening of the valve 116 so as to maintain the pressure of the water substantially equal to the pressure of the steam, in which case minimum leakage of steam into the cooling tube occurs. The apparatus continues to operate under the increased steam pressure and water pressure, whereby the cooling water effectively reduces the internal pressures within the vulcanized covering to values such that there is no danger of the cover blistering when the conductor emerges from the nozzle 33 into the atmosphere.

Should a sudden decrease in the pressure of the steam occur, it would result in the apparatus operating momentarily with the pressure of the water in the cooling tube substantially exceeding the pressure of the steam of the vulcanizing tube. Under such circumstances, the cooling water forces its way through the baffled tube 73 and enters the splice box 31 where it contacts the steam therein and creates a substantial increase in the condensation of the steam within the splice box. The condensate collecting in the splice box is drained off at a predetermined rate by the drain valve 127 to the pipe 128. Since the water pressure exceeds the steam pressure, there is no leakage of the steam from the vulcanizing tube into the cooling tube and the heating effect on the water by such leakage is not present in the cooling tube. The absence of the heating effect by the steam, allows the entire body of water in the cooling tube 32 to assume a somewhat lower temperature as the water circulates through the cooling tube, and the shell 105 of the bulb 62 is eventually surrounded by water of a lower temperature.

As a result, there occurs a decrease in the temperature differential of the water surrounding the bulbs 61 and 62, which causes the electronic controller to effect a reduced air pressure on the diaphragm 117 of the valve 116. The reduced air pressure on the diaphragm 117 reduces the opening of the valve and thereby reduces the pressure of the water in the cooling tube, and, consequently, the rate at which the cooling water circulates through the cooling tube. The initial regulation of the valve 116 by the controller 60 is such that the steam pressure now slightly exceeds the pressure of the water, whereby leakage of steam from the vulcanizing tube through the baffled tube 73 into the cooling tube 32 again takes place causing the temperature of the water in the cooling tube to increase slightly and thereby increase the temperature differential of the water surrounding the bulbs 61 and 62. While the leakage of steam into the cooling tube causes a gradual increase in the temperature differential measured by the bulbs, the temperature differential that existed prior to the decrease in the steam pressure will not be attained due to the decreased temperature of the steam and the vulcanized covering of the conductor 20.

The electronic controller 60, in response to the gradually increasing temperature differential of the cooling water at the bulbs 61 and 62, continuously increases the opening of the valve 116 until a temperature differential exists which regulates the valve so that the pressure of the water equals the new and lower steam pressure. When the controller 60 finally balances the water pressure with the new steam pressures, there results a lower operating temperature differential of the cooling water at the bulbs 61 and 62 than that which existed prior to the reduction in the pressure of the steam and minimum leakage of steam into the cooling tube, whereby the water is maintained at its most effective operating temperature. Since the controller 60 continuously maintains the pressure of the water substantially equal to the pressure of the steam, blistering of the covering will not occur while the covering is being cooled by the water in the cooling tube nor when the conductor emerges from the nozzle 33 into the atmosphere.

To maintain such a control of the water pressure with respect to the steam pressure, the controller is initially adjusted so that for any given steam pressure and resulting temperature differential in the cooling water surrounding the bulbs 61 and 62, the pressure of the water in the cooling tube is maintained slightly under the pressure of the steam in the vulcanizing tube so that there is always present a normal but minimum leakage of steam into the cooling tube. This is due to the fact that it is preferable to have the leakage occur from the vulcanizing tube to the cooling tube, rather than the reverse condition, because the amount of steam condensed under these conditions is at a minimum, and, hence, the steam consumption of the apparatus is accurately regulated so as to maintain a high degree of efficiency in the operation of the apparatus.

In operating continuous vulcanizing apparatus like that described hereinabove, it has been found that a steam pressure of at least 150 pounds per square inch in the vulcanizing tube will satisfactorily vulcanize the covering on the conductor advancing therethrough. Under certain operating conditions established by the size of the conductor and the rate at which it travels through the vulcanizing tube, it has been found that a vulcanizing tube approximately 200 feet long having steam under a pressure of 250 pounds per square inch will prove satisfactory. With such a steam pressure, the water in the supply line is maintained at a pressure of 270 pounds per square inch to allow for fluctuations in the steam pressure. The valve 116, in response to the controller 60, reduces the pressure of the water admitted to the cooling tube so that it is substantially equal to the pressure of the steam at all times. Under these conditions, it has been found that, when the cooling tube 32 is approximately sixteen feet long and the nozzle 33 is approximately three feet long, the apparatus will cool the covering and reduce the internal pressures entrapped therein so that danger of the covering blistering after it has passed through the cooling tube is prevented.

The vulcanizing tube 22, the splice box 31, the cooling tube 32 and the nozzle 33 have been described as separate elements for the purpose of simplifying the specification and for emphasizing the particular function each element performs in the treatment of the insulated conductor 20. The vulcanizing tube 22 comprises a plurality of lengths of pipe to form a vulcanizing tube having a predetermined length. The splice box 31 is interposed between the exit end of the vulcanizing tube and the entrance end of the cooling tube to provide a closure which may be opened when the conductor 10 is threaded from the extruding head 16 through the vulcanizing tube and cooling tube. Since these elements provide a continuous chamber in which the conductor is enclosed from the time it leaves the extruding head 16 until it emerges from the nozzle 33, the entire assembly could be considered as a single tube having a steam-filled portion sufficiently long to vulcanize the covering on the core 10, and a water filled portion sufficiently long to cool the covering before it emerges into the atmosphere.

What is claimed is:

1. An apparatus for the continuous vulcanization of a vulcanizable covering surrounding a continuously advancing core, which comprises an elongated tube through which the covered core passes continuously, means for supplying a high temperature, high pressure vulcanizing fluid to the portion of the tube first encountered by the core to vulcanize the covering on the advancing core, means for supplying a low temperature cooling fluid under pressure to a portion of the tube subsequently encountered by the core to cool the vulcanized covering, said fluids meeting at a point intermediate the ends of the tube whereby the cooling fluid is subject to a heat gain from the vulcanizing fluid that varies with differences between the pressures of the fluids and effects corresponding temperature differentials between different points in the cooling fluid, means for measuring the temperatures at predetermined spaced points within the cooling fluid, and means responsive to the temperature differentials between said spaced points in the cooling fluid as measured by said temperature measuring means for maintaining the pressures of the vulcanizing fluid and the cooling fluid substantially equal.

2. An apparatus for the continuous vulcanizing of a vulcanizable covering surrounding a continuously advancing core, which comprises an elongated tube through which the covered core passes continuously, means for supplying a high temperature, high pressure vulcanizing fluid to a portion of the tube first encountered by the advancing core as it passes through the tube to vulcanize the covering thereon, means for supplying a low temperature cooling fluid under pressure to a portion of the tube subsequently encountered by the core as it passes through the tube to cool the vulcanized covering, said fluids meeting at a point intermediate the ends of the tube whereby the cooling fluid is subject to a heat gain from the vulcanizing fluid that varies with differences between the pressures of said fluids and effects corresponding temperature differentials between different points in the cooling fluid, temperature-sensitive elements immersed in the cooling fluid at spaced points in the cooling portion of the tube, and an electronic controller connected to the temperature-sensitive elements and responsive to differences in the temperatures of those portions of the cooling fluid surrounding the temperature-sensitive elements as measured by those elements for maintaining the pressures of the vulcanizing fluid and the cooling fluid substantially equal.

3. An apparatus for the continuous vulcanizing of a vulcanizable covering surrounding a continuously advancing core, which comprises an elongated tube through which the advancing covered core passes continuously, means for supplying high temperature, high pressure steam to a portion of the tube first encountered by the core as it passes therethrough to vulcanize the covering thereon, means for supplying low temperature cooling water under pressure to a portion of the tube subsequently encountered by the core to cool the vulcanized covering, said water being in heat exchange contact with the steam whereby the water is subject to a heat gain from the steam that varies with differences between the pressures of the water and the steam and effects corresponding temperature differentials between spaced points in the cooling water, a temperature-sensitive element subject to the temperature of the cooling water at the entrance end of the cooling portion of the tube, a second temperature-sensitive element subject to the temperature of the water at a point in the cooling portion of the tube removed from the first-mentioned temperature-sensitive element, and an electronic controller connected to the temperature-sensitive elements and responsive to the temperature differentials existing in the cooling water surrounding the temperature-sensitive elements as measured by those elements for maintaining the pressure of the cooling water substantially equal to the pressure of the steam.

4. An apparatus for the continuous vulcanization of a vulcanizable covering surrounding a continuously advancing core, which comprises means for subjecting the covering on the advancing core to a high temperature, high pressure vulcanizing vapor to vulcanize the covering, means for subjecting the vulcanized covering to a high pressure, low temperature cooling liquid as it emerges from said vulcanizing vapor to cool the vulcanized covering, said vulcanizing vapor being in heat exchange contact with the cooling liquid and thereby effecting a temperature differential between spaced points in the cooling liquid that varies with differences between the pressures of said vapor and liquid, means for measuring the temperatures at predetermined spaced points within the cooling liquid, and a controller actuated by the temperature measuring means and responsive to the temperature differentials existing between said spaced points in the cooling liquid for continuously maintaining the pressures of the vulcanizing vapor and the cooling liquid substantially equal.

5. An apparatus for vulcanizing a vulcanizable covering surrounding a continuously advancing core wherein high internal pressures develop in entrapped pockets of air and moisture within the covering upon vulcanization of the covering thereof, which comprises means for subjecting the covering on the advancing conductor to a high temperature, high pressure vulcanizing fluid to vulcanize said covering, means for subjecting the vulcanized covering to a high pressure, low temperature cooling fluid as it emerges from said vulcanizing fluid to cool the vulcanized covering and thereby reduce the internal pressures therein to values such that there is no danger of blistering when the conductor emerges from the cooling fluid into the atmosphere, said vulcanizing fluid being in heat exchange contact with the cooling fluid and thereby effecting a temperature differential in the cooling fluid between spaced points therein which varies with fluctuations in the pressures of the said fluids, a temperature-sensitive element positioned in the cooling fluid at a point adjacent to the contact point of the fluids, a second temperature-sensitive element positioned in the cooling fluid at a point remote from the first temperature-sensitive element, and means responsive to the temperature differentials existing between said temperature-sensitive elements for maintaining the pressure of the cooling fluid substantially equal to the pressure of the vulcanizing fluid.

6. An apparatus for the vulcanization of a vulcanizable covering surrounding a continuously advancing core, which comprises an elongated vulcanizing tube through which such a covered core may be advanced, means for supplying a high temperature, high pressure vulcanizing fluid to the vulcanizing tube to vulcanize the covering on the core, an elongated cooling tube connected directly to the exit end of the vulcanizing tube, means for continuously circulating a low temperature cooling fluid under pressure through the cooling tube to cool the vulcanized covering of the core, said vulcanizing fluid being in heat exchange contact with the cooling fluid and thereby effecting differentials between the temperature of the water entering the cooling tube and the temperature of the water leaving the cooling tube which vary with fluctuations in the pressure differential between the said fluids, means for measuring the temperatures of the portions of the cooling fluid entering and leaving the cooling tube, and means responsive to variations in the differences between the temperatures measured by said temperature measuring means for continuously maintaining the cooling fluid at a pressure which will permit only a minimum leakage of the vulcanizing fluid into the cooling tube, whereby the cooling fluid is maintained at its most effective operating temperature at all times.

7. An apparatus for the continuous vulcanization of a vulcanizable covering surrounding a continuously advancing conductor, which comprises an elongated vulcanizing tube through which the covered conductor may be advanced, means for supplying high temperature, high pressure steam to the vulcanizing tube to vulcanize the covering on the conductor, an elongated cooling tube communicating with the exit end of the vulcanizing tube, means for continuously supplying fixed temperature, high pressure cooling water into the cooling tube to cool the vulcanized covering of the conductor as it passes therethrough, a temperature-sensitive element positioned in the cooling tube so as to be subject only to the temperature of the cooling water entering the tube, a second temperature-sensitive element positioned so as to be subject to the temperature of the water near the exit end of the cooling tube, said steam being in heat exchange contact with the water and thereby creating a temperature in the cooling water surrounding said temperature-sensitive elements that varies with fluctuations in the pressure differential between the steam and the water, and means responsive to the temperature differentials existing between the temperature-sensitive elements for regulating the water supplying means so as to maintain the pressure of the water substantially equal to the pressure of the steam in the vulcanizing tube, whereby minimum leakage of steam into the cooling tube occurs.

8. An apparatus for the vulcanization of a vulcanizable covering surrounding a continuously advancing conductor, which comprises an elongated vulcanizing tube through which such a covered conductor may be advanced, means for supplying high, but fluctuating pressure, high temperature steam to the vulcanizing tube, an elongated cooling tube connected to the exit end of the vulcanizing tube through which the covered conductor passes as it emerges from the vulcanizing tube, a supply of low temperature water maintained at a pressure above the maximum pressure of the steam admitted to the vulcanizing tube, means for continuously transmitting water from said high pressure source to the cooling tube at a point adjacent to its connection to the vulcanizing tube, means provided in the water transmitting means for selectively controlling the pressure of the water introduced into the cooling tube, a temperature-sensitive element subject to the temperature of the water entering the cooling tube, a second temperature-sensitive element subject to the temperature of the water near the exit end of the cooling tube, said steam contacting the water at a point adjacent to the exit end of the vulcanizing tube and creating a temperature differential in the cooling water surrounding the temperature-sensitive elements which varies with the fluctuations in the pressure of the steam, and an electronic controller responsive to the temperature differentials existing between those portions of the cooling water adjacent to the temperature-sensitive elements for actuating the water controlling means so as to maintain the water pressure substantially equal to the steam pressure, whereby excessive steam penetration into the cooling tube is prevented and vice versa.

9. An apparatus for the vulcanization of a vulcanizable covering surrounding a continuously advancing conductor, which comprises an elongated vulcanizing tube through which the covered conductor passes, means for supplying high temperature, high but variable pressure steam to the vulcanizing tube for vulcanizing the covering surrounding the conductor passing therethrough, a cooling tube connected in tandem with the vulcanizing tube through which the wire passes after it leaves the vulcanizing tube, means for continuously supplying low temperature water under high pressure to the cooling tube adjacent to its connection to the vulcanizing tube to cool the vulcanized covering of the conductor as it passes therethrough, a nozzle secured to the exit end of the cooling tube through which the conductor passes for gradually reducing the pressure of the water escaping from the exit end of the cooling tube to substantially that of the atmosphere, a temperature-sensitive element subject to the temperature of the water at the entrance end of the cooling tube, a second temperature-sensitive element subject to the temperature of the water at the exit end of the cooling tube, said steam contacting the cooling water adjacent to the exit end of the vulcanizing tube and effecting a temperature differential in the cooling water at opposite ends thereof that varies with fluctuation in the pressure of the steam, and an electronic controller continuously responsive to the temperature differentials existing between the temperature-sensitive elements to regulate the water supplying means so as to maintain the pressure of the water in the cooling tube substantially equal to the pressure of the steam in the vulcanizing tube.

10. An apparatus for the vulcanization of a vulcanizable covering surrounding a continuously advancing electrical conductor, which comprises an elongated vulcanized tube through which the conductor passes, means for supplying high pressure, high temperature steam to the tube to vulcanize the covering on the conductor, an elongated cooling tube through which the moving conductor passes upon emerging from the vulcanizing tube, means for continuously circulating low temperature water through the cooling tube to cool the vulcanized covering of the conductor, a partition positioned intermediate the ends of the cooling tube and having a center aperture through which the water and the conductor pass for causing the water adjacent to the walls of the tube to mix with the water adjacent to the conductor, said steam contacting the water adjacent to the exit end of the vulcanizing tube and effecting a temperature differential in the cooling water at opposite ends of the cooling tube that varies with fluctuations in the pressures of the steam and the water, and means including an electronic controller responsive to the temperature differentials existing in the cooling water at the opposite ends of the cooling tube for maintaining the pressure of the water in the cooling tube substantially equal to the pressure of the steam in the vulcanizing tube.

11. In an apparatus for the vulcanization of a vulcanizable covering surrounding a continuously advancing electrical conductor wherein a covered conductor passes continuously through an elongated vulcanizing tube containing high temperature, high but fluctuating pressure steam to vulcanize the covering on the conductor, the combination with the vulcanizing tube of an elongated cooling tube connected in tandem with the vulcanizing tube, a baffled tube positioned at the entrance end of the cooling tube through which the conductor passes, a nozzle connected to the exit end of the cooling tube permitting continuous passage of the covered conductor from the cooling tube into the atmosphere, means for continuously circulating low temperature water under high pressure through the cooling tube from the entrance end thereof through the nozzle to cool the vulcanized covering of the conductor, a partition positioned intermediate the ends of the cooling tube and having a central aperture through which the water and the conductor pass for causing the water adjacent to the wall of the tube to mix with the water adjacent to the conductor, said steam contacting the water in the baffled tube and effecting a temperature differential in the cooling water at opposite ends of the cooling tube which varies with fluctuations in the pressure of the steam, a temperature-sensitive element subject to the temperature of the water near the entrance end of the cooling tube, a second temperature-sensitive element subject to the temperature of the water near the exit end of the cooling tube, said temperature-sensitive elements being positioned on opposite sides of said partition, and an electronic controller responsive to temperature differentials existing between the temperature-sensitive elements for regulating the water circulating means so as to maintain the pressure of the water in the cooling tube substantially equal to the pressure of the steam in the vulcanizing tube at all times, whereby excessive escape of the steam into the cooling tube and water into the vulcanizing tube is prevented.

12. An apparatus for the vulcanization of a vulcanizable covering surrounding a continuously advancing conductor, which comprises an elongated vulcanizing tube through which such a covered conductor may be advanced, means for supplying high but fluctuating pressure, high temperature steam to the vulcanizing tube to vulcanize the covering on the advancing core, an elongated cooling tube connected to the exit end of the vulcanizing tube through which the insulated conductor passes as it emerges from the vulcanizing tube, a supply of water maintained at a predetermined low temperature and at a pressure above the maximum pressure of the steam admitted to the vulcanizing tube, means for continuously transmitting water from said high pressure supply to the cooling tube adjacent to its connection with the vulcanizing tube, an air-operated valve provided in the water transmitting means for selectively controlling the water pressure in the cooling tube, said steam being in heat exchange contact with the cooling water adjacent to the exit end of the vulcanizing tube and effecting a temperature differential in the water between the temperature of the water entering and leaving the cooling tube which varies with the fluctuations in the pressure of the steam, a resistance bulb subject only to the temperature of the water entering the cooling tube, a second resistance bulb subject to the temperature of the water near the exit end of the cooling tube, and an electronic controller responsive to temperature differentials existing between the resistance bulbs for controlling the air-operated valve so as to maintain the water pressure substantially equal to the steam pressure.

13. The process for the vulcanization of a vulcanizable covering surrounding a continuously advancing electrical core, which comprises passing the covered core continuously through a high pressure, high temperature vulcanizing fluid to vulcanize the covering, passing the core and its vulcanized covering continuously and directly from said vulcanizing fluid through a cooling fluid to cool the vulcanized covering, measuring the temperatures of the cooling fluid at spaced points along the path of travel of the core through the cooling fluid, said vulcanizing fluid contacting the cooling fluid and effecting a temperature differential in the cooling fluid between the points at which the temperatures are measured which varies with fluctuations in the pressure differential between the said fluids, and continuously regulating the pressure of the cooling fluid in accordance with the temperature differentials existing therein between the points where the temperatures are measured to maintain the cooling fluid at a pressure substantially equal to the pressure of the vulcanizing fluid, whereby only a minimum escape of the vulcanizing fluid into the cooling fluid occurs and the cooling fluid is maintained at its most effective operating temperature.

14. The process for the vulcanization of a vulcanizable covering surrounding a continuously advancing electrical conductor, which comprises passing the covered conductor continuously through a vulcanizing zone, introducing high but fluctuating pressure steam into the vulcanizing zone to vulcanize the covering surrounding the conductor, passing the conductor and the vulcanized covering continuously and directly from said vulcanizing zone through a cooling zone, continuously introducing low temperature water under pressure in the cooling zone to cool the vulcanized covering as the conductor passes therethrough, continuously measuring the temperatures of the cooling water at spaced points in the cooling zone, said steam contacting the cooling water adjacent to the exit end of the vulcanizing zone and effecting a temperature differential in the water between the points at which the temperatures are measured which varies with fluctuations in the pressure of the steam in the vulcanizing zone, and continuously regulating the pressure of the cooling water introduced into the cooling zone in accordance with the temperature differentials existing in the cooling water between the points where the temperatures are measured to maintain the pressure of the cooling water in the cooling zone substantially equal to the pressure of the steam in the vulcanizing zone.

15. The process for the vulcanization of a vulcanizable covering surrounding a continuously advancing electrical conductor in which undesirable high internal pressures are developed in entrapped pockets of air and moisture when the covering is vulcanized, which comprises passing the covered conductor continuously through a vulcanizing zone, subjecting the covering to high but fluctuating pressure, high temperature steam while passing through said vulcanizing zone to vulcanize the covering, passing the conductor and the vulcanized covering continuously from said vulcanizing zone into and through a cooling zone, continuously circulating low temperature water under pressure through the cooling zone to cool the vulcanized covering, continuously measuring the temperatures of the cooling water as it enters the cooling zone and at a point near the exit end of the cooling zone, said steam contacting the water adjacent to the exit end of the vulcanizing zone and effecting a temperature differential in the water between the points at which the temperatures are measured which varies with fluctuations in the pressure differential between the water and the steam, and utilizing the temperature differentials existing in the cooling water between the points where the temperatures are measured to maintain the cooling water at a pressure substantially equal to the pressure of the steam in the vulcanizing zone, whereby the internal pressures within the coverings are reduced by the cooling water to values such that there is no danger of the covering blistering as the vulcanized covering passes through the cooling zone.

16. An apparatus for the continuous vulcanizing of a vulcanizable covering surrounding a continuously advancing core, which comprises an elongated vulcanizing tube through which a core having a vulcanizable covering may be advanced, means for supplying high but fluctuating pressure, high temperature steam to the vulcanizing tube to vulcanize the covering on the core, an elongated cooling tube connected in tandem to the vulcanizing tube through which the covered core passes as it leaves the vulcanizing tube, means for continuously circulating high pressure water at a predetermined low temperature through the cooling tube from the entrance end to the exit end thereof to cool the vulcanized covering, an air-controlled valve for regulating the pressure of the water circulating through the cooling tube, a resistance bulb subject only to the temperature of the water entering the cooling tube, a second resistance bulb subject to the temperature of the water near the exit end of the cooling tube, said steam contacting the water adjacent to the entrance end of the cooling tube and creating a temperature differential in the cooling water between the fixed temperature of the water entering the cooling tube and the temperature of the water near the exit end of the cooling tube which varies with the fluctuations in the pressure of the steam, and an electronic controller responsive to the temperature differentials between the resistance bulbs for regulating the air-controlled valve so as to maintain the pressure of the water in the cooling tube slightly below the pressure of the steam in the vulcanizing tube.

17. An apparatus for the vulcanization of a vulcanizable covering surrounding a continuously advancing conductor, which comprises a vulcanizing tube through which a conductor having a vulcanizable covering may be advanced, means for supplying steam at approximately 250 pounds pressure to the vulcanizing tube to vulcanize the covering on the conductor, said steam being subject to sudden changes in pressure, a cooling tube connected in tandem with the vulcanizing tube through which the covered conductor passes as it leaves the vulcanizing tube, a supply of water maintained at a predetermined low temperature and at a pressure of approximately 270 pounds per square inch, means for continuously circulating water from said supply through the cooling tube to cool the vulcanized covering passing therethrough, means associated with the water circulating means for selectively regulating the pressure of the water introduced into the cooling tube, a resistance bulb subject only to the temperature of the water as it enters the cooling tube, a second resistance bulb subject to the temperature of the water near the exit end of the cooling tube, said steam contacting the water adjacent to the entrance end of the cooling tube and creating a temperature differential in the cooling water between the said resistance bulbs which varies with fluctuations in the steam pressure, and an electronic controller responsive to the temperature differentials in the cooling water surrounding said resistance bulbs for regulating the water pressure controlling means so as to constantly maintain a pressure differential between the water and the steam which permits a minimum escape of the steam into the cooling tube.

18. An apparatus for the continuous vulcanization of a vulcanizable covering surrounding a continuously advancing core, which comprises an elongated vulcanizing tube through which the covered core may be advanced, means for supplying high temperature, high pressure steam to the vulcanizing tube to vulcanize the covering on the core, a cooling tube connected to the exit end of the vulcanizing tube, means for continuously introducing low temperature water into the cooling tube at a pressure which permits a predetermined leakage of the steam into the cooling tube, said leakage of the steam into the water creating a temperature differential in the cooling water at opposite ends of the cooling tube which varies with fluctuations in the pressure differential between the water and the steam, means for measuring differentials in the temperatures of the cooling water at the opposite ends of the cooling tube, and a controller responsive to the temperature differentials existing in the cooling water at opposite ends of the cooling tube as measured by said temperature differential measuring means for continuously maintaining the cooling water at a pressure which permits only the said predetermined leakage of the steam into the cooling tube.

19. The process for the vulcanization of a vulcanizable covering surrounding a continuously advancing core, which comprises passing the covered core continuously through an elongated treating zone, subjecting the advancing core to a high temperature, high pressure vulcanizing fluid within the portion of the treating zone first encountered by the advancing core to vulcanize the covering thereon, subjecting the advancing core to a low temperature cooling fluid within the next succeeding portion of the treating zone to cool the vulcanized covering, measuring the temperature differentials between spaced points in the cooling fluid, and controlling the relative pressures of the fluids in accordance with the measured temperature differentials existing between said spaced points in the cooling fluid so as to maintain the pressures of the cooling fluid and the vulcanizing fluid substantially equal.

20. The process for the vulcanization of a vulcanizable covering surrounding a continuously advancing core, which comprises passing the covered core through an elongated treating zone, introducing high pressure steam into the initial portion of the treating zone to vulcanize the covering thereon, introducing high pressure, low temperature water within the next succeeding portion of the treating zone to cool the vulcanized covering, measuring the temperatures prevailing at two spaced points within the cooling water, and controlling the relative pressures of the steam and water in accordance with the temperature differentials existing between the spaced points in the cooling water at which said temperatures are measured so as to continuously maintain the cooling water at a pressure substantially equal to the pressure of the steam.

GEORGE E. BERGGREN.

REFERENCES CITED

The following references are of record in the file of this patent:

UNITED STATES PATENTS

| Number | Name | Date |
| --- | --- | --- |
| 2,069,087 | Forstrom et al. | Jan. 26, 1937 |
| 2,291,344 | Powell | July 28, 1942 |
| 2,373,816 | De Roche et al. | Apr. 17, 1945 |
| 2,426,341 | Canfield | Aug. 26, 1947 |
| 2,446,620 | Swallow et al. | Aug. 10, 1948 |

FOREIGN PATENTS

| Number | Country | Date |
| --- | --- | --- |
| 864,121 | France | Jan. 8, 1941 |